United States Patent [19]

Horton

[11] 4,198,921

[45] Apr. 22, 1980

[54] FLUID PRESSURE ACTUATORS INDICATOR

[75] Inventor: Roy Horton, Exeter, England

[73] Assignee: Sparex Ltd. of Exeter Airport, England

[21] Appl. No.: 956,789

[22] Filed: Nov. 1, 1978

[30] Foreign Application Priority Data

Feb. 15, 1978 [GB] United Kingdom ................ 5979/78

[51] Int. Cl.$^2$ ............................................. G01D 21/00

[52] U.S. Cl. .................................... 116/283; 116/285; 116/327

[58] Field of Search ............... 116/283, 282, 278, 285; 33/138; 116/327

[56] References Cited

U.S. PATENT DOCUMENTS

| | | | |
|---|---|---|---|
| 2,704,047 | 3/1955 | Lushenko | 116/285 |
| 3,004,346 | 10/1961 | Quenot | 33/138 |
| 3,077,179 | 2/1963 | Evanson | 116/285 |
| 4,052,954 | 10/1977 | Roy | 116/285 |

FOREIGN PATENT DOCUMENTS

| | | | |
|---|---|---|---|
| 1226632 | 3/1971 | United Kingdom | 116/283 |

*Primary Examiner*—S. Clement Swisher

*Assistant Examiner*—Denis E. Corr

*Attorney, Agent, or Firm*—Thomas J. Greer, Jr.

[57] ABSTRACT

A fluid pressure actuator such as an hydraulic top link has an external indicator device for marking the position of the piston within the actuator cylinder. The indicator has a collar which clamps on to the piston rod and a finger which extends longitudinally along the outside of the actuator cylinder to provide a direct reading of the piston position. An indirect indication may be provided by linking the longitudinally extending finger to a spring loaded tape indicator, or to an indicator arm which moves angularly across a scale.

2 Claims, 6 Drawing Figures

FLUID PRESSURE ACTUATORS INDICATOR

This invention relates to fluid pressure actuators of the piston and cylinder type and is applicable both to hydraulic and pneumatic actuators.

An object of the invention is to provide a simple but effective position marker device which can be fitted to a fluid pressure actuator to provide a visual indication of the position of the piston within the cylinder of the actuator. Such a visual indication is desirable where an actuator is controlled manually, and is located in a relatively inaccessible position, so that the person controlling the actuator does not have an unobstructed view of the piston shaft of the actuator. For example, an hydraulic actuator incorporated in an extensible top link of a tractor three-point linkage and located behind the tractor driver may be difficult to observe. Similar difficulty may arise with hydraulic "levelling boxes" sometimes employed on tractor three-point linkages to adjust the relative inclination of the lower links of the linkage.

The present invention provides a fluid pressure actuator comprising a piston slidable within a cylinder, a piston rod connected to the piston and projecting through a seal in an end wall of the cylinder, and a position marker device attached to the piston rod externally of the cylinder, the marker device having an arm which extends generally parallel to the longitudinal axis of the cylinder externally of the cylinder, the arm being adapted or arranged to provide a visual indication of the position of the ram in the cylinder.

The position marker device of the present invention enables a visual indication to be given by a simple direct mechanical connection to the piston rod, even if the full extent of the piston rod is not visible from a controlling position, for example from the driving seat of a tractor. The visual indication may be given either by the position of the arm itself or by means of an indicator system connected to the arm. Thus in one embodiment of the invention the arm is connected through a swivel joint to a pivoted indicator which is movable angularly relative to an arcuate scale upon movement of the arm by means of the piston. In an alternative embodiment the arm has a portion which moves relative to a scale on the outside of the cylinder upon movement of the piston. In a further alternative embodiment the arm is connected to one end of a spirally wound flexible strip which is spring-loaded so as to be in tension, part of the strip being visible relative to a mark or scale to provide an indication of the position of the piston.

The present invention also provides a position marker device for indicating the position of a piston in a cylinder of an actuator, the device comprising a collar portion which fits upon a piston rod connected to the piston and an arm attached to the collar portion which, when the collar portion is fitted to the piston rod, extends generally parallel to the longitudinal axis of the cylinder externally thereof to act as an indicator of the position of the piston in the cylinder. The device according to the invention can be fitted to an existing fluid pressure actuator by attaching the collar portion to the piston rod of the actuator. The position marker device may be made of resilient wire, the arm being integral with the collar portion. Thus the collar portion may be open on one side, so that it can be fitted onto a piston rod from one side, a screw or bolt being provided for clamping the collar portion about the piston rod.

The invention will be further described, by way of example, with reference to the accompanying purely diagrammatic drawings, in which.

In the drawings the same reference numerals are used throughout to designate the same or corresponding component parts.

Figure 1:
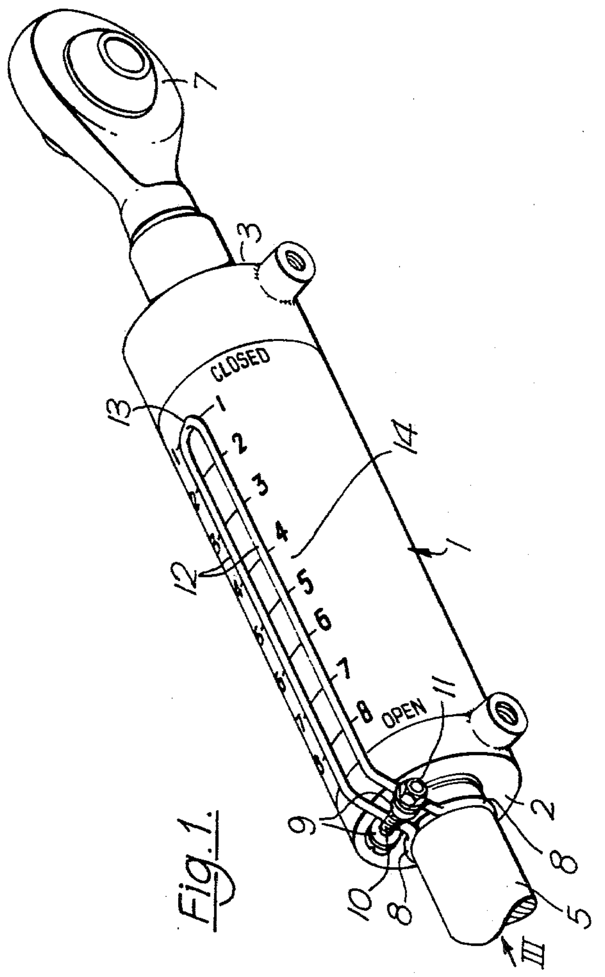
FIG. 1 is a diagrammatic perspective view of a fluid pressure actuator incorporating a position marker device according to one embodiment of the invention.
Figure 2:
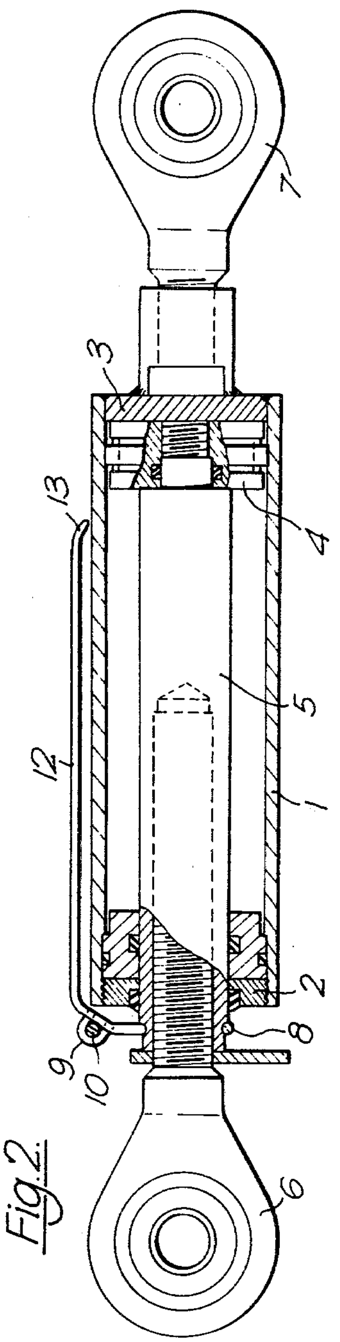
FIG. 2 is a longitudinal axial section of the actuator shown in FIG. 1, for use as part of an extensible top link in a tractor three-point linkage.

FIGS. 1 and 2 show an hydraulic actuator comprising a cylinder 1 having end walls 2, 3 and a piston 4 fluid tightly slidable within the cylinder. A piston rod 5 is attached to the piston 4 and passes through seals in one of the end walls 2.

The illustrated actuator forms an extensible top link for a tractor three-point towing linkage. Externally of the end wall 2 the piston rod 5 is connected to a swivel eye 6 within which a swivel ball is located. A similar swivel eye 7 is welded to the exterior of the other end wall 3 of the cylinder. The two swivel eyes 6, 7 are connected respectively to an upper anchorage point on a tractor and to an upper attachment point of a three-point linkage on an implement or machine to be supported by the tractor.

To provide a visual indication of the position of the piston 4 within the cylinder 1 a position marker device is attached to the piston rod 5 externally of the cylinder end wall 2.

In the embodiment of FIGS. 1 and 2 the position marker device comprises a collar portion 8 which is open on one side (FIG. 3) so that it can be fitted laterally around the piston rod 5. The collar portion 8 is formed from resilient wire and the same wire is looped to form two eyes 9 adjoining the collar portion on opposite sides of the gap in the latter, these eyes 9 being aligned with each other so that a clamping screw 10 can be inserted through the eyes 9 and a nut 11 tightened on the screw 10 to clamp the collar portion 8 upon the piston rod 5. The wire from which the collar portion 8 is formed is bent through a right angle on the other side of the eyes 9 from the collar portion 8 and then forms an elongate loop 12 extending parallel to the axis of the cylinder 1 externally of the latter, the loop 12 terminating in a pointer 13 which is bent towards the surface of the cylinder 1 and which cooperates with a graduated scale 14 on the surface of the cylinder (FIG. 1). The scale 14 may be printed or engraved upon a label affixed to the actuator cylinder 1. The flat loop 12 has parallel sides extending parallel to the longitudinal axis of the cylinder 1.

It will be clear from FIGS. 1 and 2 that the ram position marker device moves with the piston rod 5 so that the pointer 13 indicates directly on the graduated scale 14 the position of the piston 4 within the cylinder 1.

Figure 3:
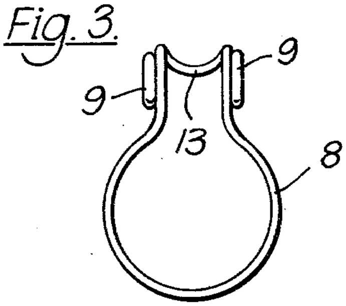
FIG. 3 is an end view on an enlarged scale of the position marker device used in the actuator of FIGS. 1 and 2, viewed in the direction of arrow III in FIG. 1.
Figure 5:
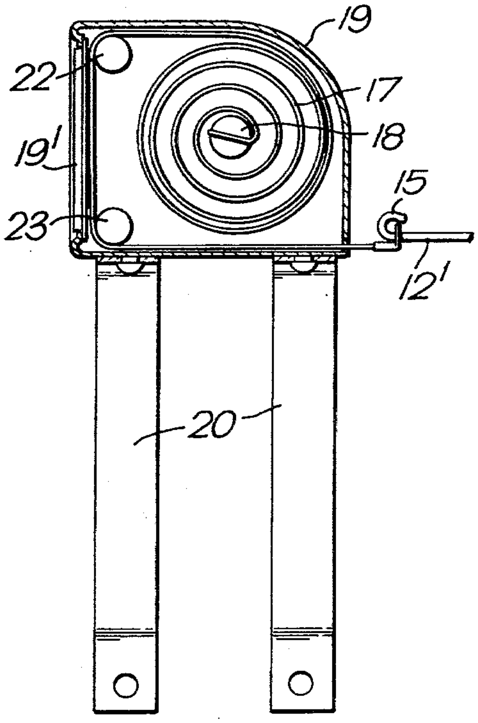
FIG. 5 is a longitudinal section on line V—V of FIG. 4.
Figure 4:
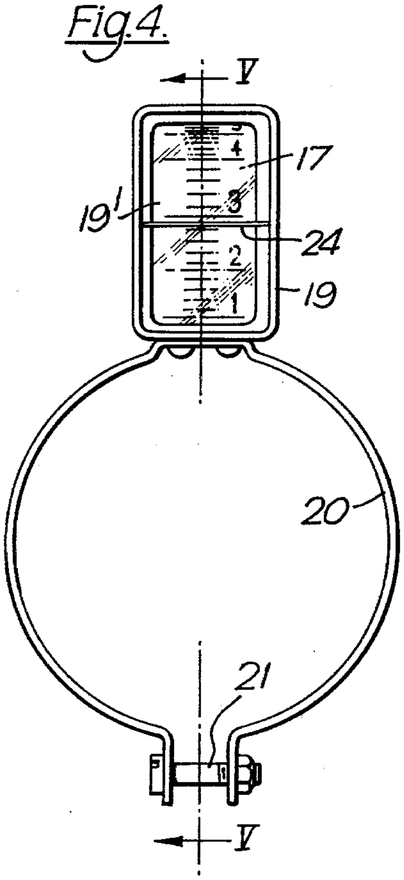
FIG. 4 is an end view corresponding to FIG. 3 of an alternative embodiment of a position marker device according to the invention.

FIGS. 4 and 5 illustrate an alternative embodiment of a ram position marker device for use with a device such as that shown in FIGS. 1 to 3. A longitudinally extending arm 12', which may comprise an elongate loop such as the loop 12 of the device shown in FIGS. 1 and 2, has a hooked end 15 which is connected to one end of a spring loaded flexible strip or tape 17 of metal or plastics which is spirally wound upon a rotatable spindle 18 contained in a housing 19, the axis of the spindle 18 being perpendicular to the longitudinal axis of the cylinder 1. A torsional biassing spring (not shown) acts upon the spindle 18, urging the latter in a direction of rotation (clockwise in FIG. 5) such as to wind the tape 17 onto the spindle 18. The housing 19 is mounted upon the cylinder 1 by means of two strip-metal attachment clips 20 each of which has a clamping screw 21 (FIG. 4).

The housing 19 has an upstanding edge wall 19' provided with a window, disposed in a plane generally perpendicular to the longitudinal axis of the cylinder 1. The tape 17, as it unwinds from the spiral coil within the housing 19, passes over two idler rollers 22, 23 adjacent opposite ends of the window, so that the portion of the tape 17 between the two pulleys 21 and 22 is flat and parallel to the window. The surface of the tape 17 which faces the window is graduated, and the graduations on the tape are visible through the window, which carries a fixed fiducial mark 24. The reading of the graduated scale on the tape 17 at the position of the fiducial mark 24 gives a direct indication of the position of the arm 12' and, therefore, of the position of the piston within the cylinder.

The housing 19 can be mounted upon the cylinder at any convenient position, and the wall 19' so orientated that it is clearly visible to an operator controlling the hydraulic actuator.

Figure 6:
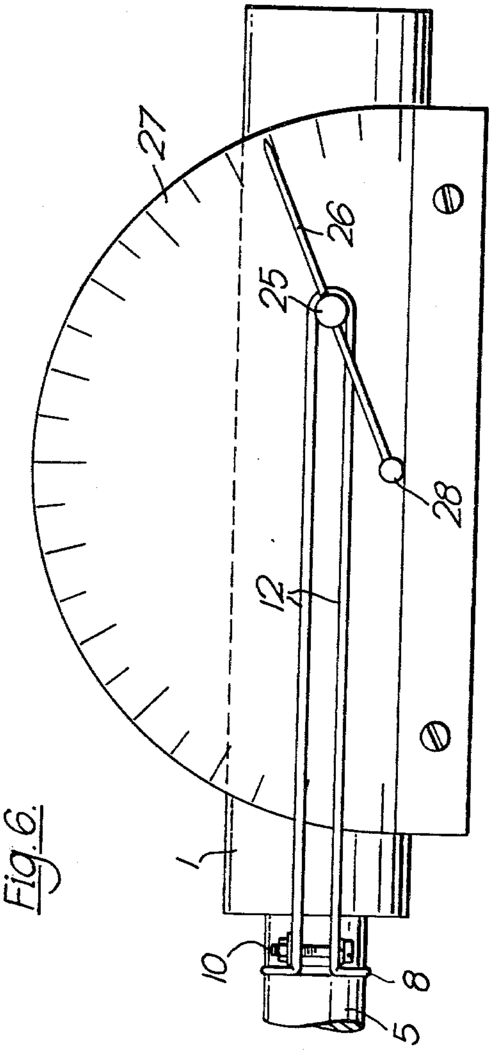
FIG. 6 is a diagrammatic plan view of part of an actuator position marker device according to another embodiment of the invention.

In a further alternative embodiment, illustrated diagrammatically in FIG. 6, the axially movable arm of the position indicator device, for example the axially extending loop 12, is connected through a swivel joint 25 to a pivoted arm 26 or pointer which moves over an angular scale 27 fixed relative to the cylinder 1. The arm 26 is attached at one end to a fixed pivot 28 located at the centre of the angular scale 27 and spaced from the swivel joint 25. The position of the arm 26 relative to the scale 27 is indicative of the axial position of the elongate loop 12 of the ram position indicator device.

What is claimed is:

1. A position marker device for indicating the position of a piston in a cylinder of an actuator, said actuator having a piston rod projecting from the cylinder, the device comprising a collar portion adapted to be fitted to the piston rod externally of the cylinder and an arm formed integrally with the collar portion, both said collar portion and said arm being made of resilient wire and said arm, in use of the device with the collar portion fitted to the piston rod, extending generally parallel to the longitudinal axis of the cylinder externally thereof to act as an indicator of the position of the piston in the cylinder.

2. The device defined in claim 1, wherein the collar portion is open on one side, so that it can be fitted onto a piston rod from one side, and including a screw element engaging the collar portion for clamping the collar portion about the piston rod, said screw element extending across the open side of the collar portion.

* * * * *